United States Patent [19]

Mueller-Borges et al.

[11] Patent Number: 5,286,820
[45] Date of Patent: Feb. 15, 1994

[54] USE OF SALTS OF SULFONATED ALKENYL OR ALKENYL(POLY)-OXYALKYL PHOSPHATES AS EMULSIFIERS FOR EMULSION POLYMERIZATION

[75] Inventors: Joachim Mueller-Borges, Monheim; Rainer Hoefer, Duesseldorf; Bernd Fabry, Korschenbroich, all of Fed. Rep. of Germany

[73] Assignee: Henkel Kommanditgesellschaft auf Aktien, Duesseldorf, Fed. Rep. of Germany

[21] Appl. No.: 852,255

[22] PCT Filed: Nov. 22, 1990

[86] PCT No.: PCT/EP90/01988
§ 371 Date: Jun. 1, 1992
§ 102(e) Date: Jun. 1, 1992

[87] PCT Pub. No.: WO91/08236
PCT Pub. Date: Jun. 13, 1991

[30] Foreign Application Priority Data
Dec. 1, 1989 [DE] Fed. Rep. of Germany ....... 3939839

[51] Int. Cl.$^5$ ................................................. C08F 2/26
[52] U.S. Cl. ..................................... 526/193; 526/225
[58] Field of Search ............................. 526/193, 225

[56] References Cited

U.S. PATENT DOCUMENTS 4,290,930 9/1981 Noelken .................. 260/29.6 MP
5,041,597 8/1991 Fabry et al. ...................... 558/183

FOREIGN PATENT DOCUMENTS 63-84625 4/1988 Japan ................................ 526/193

OTHER PUBLICATIONS

"Polymerization Processes" by Schildknecht et al 1977 pp. 143-145.

Primary Examiner—Joseph L. Schofer
Assistant Examiner—N. Sarafim
Attorney, Agent, or Firm—Ernest G. Szoke; Wayne C. Jaeschke; Henry E. Millson, Jr.

[57] ABSTRACT

In the emulsion polymerization of monomers wherein at least one monomer is substantially water insoluble, the presence in the emulsion polymerization mixture of one or more emulsifiers having the formula:

$$[R^1O-(C_nH_{2n}O)_x-][R^2O-(C_nH_{2n}O)_y-][R^3O-(C_nH_{2n}O)_z-]P=O \quad (I)$$

in which $R^1$ is a group corresponding to formula IIa or IIb $$CH_3-(CH_2)_a-CH(OH)-(CH_2)_b-CH(SO_3M)-(CH_2)_c-CH_2- \quad (IIa)$$

or $$CH_3-(CH_2)_a-CH(SO_3M)-(CH_2)_b-CH(OH)-(CH_2)_c-CH_2- \quad (IIb)$$

or a residue formed by elimination of one water molecule from the group corresponding to formula IIa or IIb, $R^2$ and $R^3$ may be the same or different and represent hydrogen or a residue having the meaning defined for the group $R^1$, n is the number 2 and/or 3, x, y and z may be the same or different and represent numbers of 0 to 100 and, preferably, 0 to 30, a, b and c are numbers of 0 to 18, the sum of a, b and c being a number of 12 to 18, and M is an alkali metal ion, the ammonium ion, a protonated amineion, or an equivalent of an alkaline-earth metal ion.

16 Claims, No Drawings

USE OF SALTS OF SULFONATED ALKENYL OR ALKENYL(POLY)-OXYALKYL PHOSPHATES AS EMULSIFIERS FOR EMULSION POLYMERIZATION

This invention relates to the use of salts of sulfonated alkenyl or alkenyl(poly)oxyalkyl phosphates corresponding to formula I $$[R^1O-(C_nH_{2n}O)_x-][R^2O-(C_nH_{2n}O)_y-][R^3O-(C_nH_{2n}O)_z-]P=O \quad (I)$$

in which
$R^1$ is a group corresponding to formula IIa or IIb $$CH_3-(CH_2)_a-CH(OH)-(CH_2)_b-CH(SO_3M)-(CH_2)_c-CH_2- \quad (IIa)$$

or $$CH_3-(CH_2)_a-CH(SO_3M)-(CH_2)_b-CH(OH)-(CH_2)_c-CH_2- \quad (IIb)$$

or a residue formed by elimination of one water molecule from the group corresponding to formula IIa or IIb,
$R^2$ and $R^3$ may be the same or different and represent hydrogen or a residue having the meaning defined for the group $R^1$,
n is the number 2 and/or 3,
x, y and z may be the same or different and represent numbers of 0 to 100 and, more particularly, 0 to 30,
a, b and c are numbers of 0 to 18, the sum of a, b and c being a number of 12 to 18, and
M is an alkali metal or ammonium ion or an equivalent of an alkaline-earth metal ion,
as emulsifiers for emulsion polymerization.

Emulsifiers which have been described for the emulsion polymerization of polymerizable monomers containing olefinic double bonds include various ionic or nonionic emulsifiers, for example alkylaryl sulfonates, nonylphenol ethoxylates and ethylene oxide/propylene oxide block copolymers, cf. Technische Broschüre RES/VVX/4 (G), 3rd Edition, 1976, published by Shell-Chemie; α-sulfofatty acid esters, cf. DE-A 33 39 407, tertiary hydroxyalkyl amines, cf. DE-A 33 37 640, adducts of ethylene oxide with aliphatic vicinal diols containing 8 to 25 carbon atoms, cf. DEA 33 19 782, polyethyleneoxy sulfonates, cf. EP-A 0 026 932, and fatty alcohol polyethyleneoxy phosphates, cf. the emulsifiers DISPONIL ® AEP 5300, AEP 5325 and AEP 8100 of Henkel KGaA, Düsseldorf.

The above-mentioned surfactants show various disadvantages when used for emulsion polymerization. For example, the polyethyleneoxy sulfonates according to EP 0 026 932 cause intensive foaming in water-based systems containing them and, in addition, are expensive to produce. Fatty alcohol polyethyleneoxy phosphates do not have pronounced emulsifier properties and, accordingly, are only used in relatively high concentrations or in conjunction with other, stronger emulsifiers.

The present invention is based on the observation that salts of sulfonated alkenyl or alkenyl(poly)oxyalkyl phosphates, which are also referred to in short hereinafter as phosphate sulfonates, are a group of low-foaming surfactants which are easy to produce and which are eminently suitable as emulsifiers for emulsion polymerization. The phosphate sulfonates corresponding to general formula I, which may formally be regarded as partial or full esters of phosphoric acid With sulfonates of unsaturated fatty alcohols or with sulfonates of adducts of ethylene oxide and/or propylene oxide with unsaturated fatty alcohols, are known from DE-A 38 02 815(U.S. Pat. No. 5,041,597), to which reference is hereby specifically made. They may be obtained by sulfonation of phosphoric acid esterified with fatty alcohols, such as oleyl, palmitoleyl, linoleyl, gadoleyl and/or erucyl alcohol or the technical mixtures thereof typically used in oleochemistry (the phosphoric acid may be partly or completely esterified or may be present as a mixture of partial and full esters) with gaseous sulfur trioxide in suitable reactors and neutralization of the sulfonation products with bases. Internal sulfonate groups are thus introduced into the hydrocarbon radicals emanating from the unsaturated fatty alcohols.

The structure of the phosphate sulfonates of general formula I to be used in accordance with the invention has not yet been fully elucidated. By analogy with sulfonated olefins, it is assumed that one hydroxyl group and one sulfonate group is introduced into the alkyl chain per double bond of the unsaturated fatty alcohol radicals in the sulfonation and subsequent hydrolysis of the sulfonation products, structures corresponding to general formula IIa and IIb being formed. An alkenyl radical substituted by a sulfonate group can also be formed from these structures by elimination of one molecule of water. A mixture of the compounds mentioned may even be present.

The phosphate sulfonates of general formula I to be used in accordance with the invention are suitable as emulsifiers in the emulsion polymerization of virtually all industrially important, substantially water-insoluble monomers. Typical examples of such monomers are aromatic vinyl compounds, for example styrene, divinyl benzene or vinyl toluene, polymerizable olefins and diolefins, such as propene, butadiene or isoprene, esters of acrylic or methacrylic acid with linear or branched $C_{1-18}$ alcohols and, more particularly, $C_{1-8}$ alcohols, preferably methyl esters, ethyl esters, butyl esters and ethylhexyl esters thereof, vinyl esters of $C_{2-12}$ acids, more particularly vinyl acetate, vinyl propionate, vinyl-2-ethyl hexanoate and vinyl laurate, vinyl alkyl ethers containing $C_{1-18}$ alkyl groups, vinyl chloride, vinylidene chloride and the like. The monomers mentioned above may be homopolymerized or copolymerized with others of the compounds listed above in the presence of the phosphate sulfonates to be used in accordance with the invention. In addition, copolymerizations may be carried out involving up to 50% by weight other monomers which, basically, are partly or completely soluble in water, for example acrylonitrile, methacrylonitrile, semiesters of maleic or fumaric acid containing 1 to 8 carbon atoms, acrylic acid, methacrylic acid, maleic acid, fumaric acid, crotonic acid and/or itaconic acid. A mixture of ethylhexyl acrylate, methyl methacylate and (meth)acrylic acid is a typical example of such systems.

In practice, the aqueous dispersions to be prepared using the phosphate sulfonates corresponding to general formula I contain 15 to 75% by weight polymerized monomers (dry residue) in water or water-soluble organic solvents. Although a dry residue in the range from 20 to 60% by weight is preferred, aqueous dispersions containing less than 50% by weight dry residue can also be prepared for special applications. The emulsion polymerization processes mentioned above may also be carried out using other typical polymerization auxiliaries, more particularly initiators, for example inorganic peroxide compounds, such as potassium or ammonium persulfate or hydrogen peroxide, and organic peroxide compounds or organic azo compounds providing they can be used for the emulsion polymerization. The initiators are used in typical quantities, i.e. in quantities of 0.05 to 2% by weight and preferably in quantities of 0.1 to 0.5% by weight. Other suitable auxiliaries are buffers, for example sodium hydrogen carbonate, sodium pyrophosphate or sodium acetate which may be used in quantities of up to 2% by weight. Accelerators, such as formaldehyde sulfoxylate, may also be used. Other suitable auxiliaries are molecular weight regulators of the type used for emulsion polymerization, for example butanol or even organic thio compounds, such as mercaptoethanol, thioglycolic acid, octyl mercaptan or tert. dodecyl mercaptan. The polymerization processes may be carried out by any of the methods normally used for emulsion polymerization, for example by introducing all the reactants together, by monomer inflow or by emulsion inflow. In general, the temperature of the polymerization medium is kept in the range from 40° to 100° C. and preferably in the range from 50° to 90° C. A pH value of 3 to 9 is best maintained, although emulsion polymerization may also be carried out at lower pH values by virtue of the fact that the sulfonate groups cannot be saponified with the compounds according to the invention.

The above-mentioned emulsion polymerization processes are best carried out in coolable and heatable reactors equipped with a stirrer and a temperature measuring system, for example in stirred pressure tanks. Multicoil reactors or so-called loop reactors may also be used.

On completion of polymerization, the polymer dispersion is best cooled and removed from the reactor through sieves. If the reaction products are to be isolated as solid products, the polymer dispersion is best precipitated or spray-dried. However, the dispersions obtained in the polymerization process are preferably directly used as binders for paints, adhesives, paper coating compositions and other coating compounds.

Other conditions for emulsion polymerization processes using the phosphate sulfonates of general formula I to be used in accordance with the invention may be adapted to meet particular requirements or freely selected by the expert in the usual way. General specialist knowledge on the subject of emulsion polymerization may be found, for example, in E. W. Duck, Encyclopedia of Polymer Science and Technology, Vol. 5, pages 801–856, John Wiley & Sons, New York (1966) and in the literature cited therein. Reference is also made to F. Hölscher, Dispersionen synthetischer Hochpolymere (Dispersions of Synthetic High Polymers), Part 1, Springer Verlag, Berlin/Heidelberg/New York (1969) and to K. O. Calvert (Editor), Polymer Latices and their Applications, Applied Science Publishers Ltd., London (1982); A. Schmidt, Methoden der Organischen Chemie (Houben-Weyl), 4th Edition, Vol. E 20, Makromolekulare Stoffe, Part 1, pages 227–268, Stuttgart (1987).

One preferred embodiment of the invention is characterized by the use of phosphate sulfonates corresponding to general formula I or IIa or IIb, in which $R^1$ is a sulfonated oleyl group, $R^2$ and $R^3$ are hydrogen or a sulfonated oleyl group, n is the number 2 and x, y and z are numbers of 0 to 20 and, more particularly, 0 to 10 and a, b and c are as defined above.

The term "ammonium ion" used in the foregoing also encompasses protonated mono-, di- and tri-$C_{1-4}$-alkyl and $C_{1-4}$-hydroxyalkyl amines. However, phosphate sulfonates of general formula I or IIa and IIb, in which M is a sodium ion and $R^1$, $R^2$, $R^3$, a, b, c, n, x, y and z are as defined above, are preferred.

In another advantageous embodiment of the invention, the phosphate sulfonates corresponding to general formula I are used in a quantity of 0.5 to 10% by weight, preferably in a quantity of 1 to 5% by weight and, more preferably, in a quantity of 1 to 3% by weight, based on the monomers to be used. In addition, it is particularly preferred to use the phosphate sulfonates of general formula I in the emulsion polymerization of polymerizable monomers containing olefinic double bonds, more particularly (meth)acrylic acid and derivatives thereof or vinyl esters.

Although the phosphate sulfonates of general formula I to be used in accordance with the invention have very good properties when used as sole emulsifiers, they may also be used together with other anionic co-emulsifiers.

Suitable anionic co-emulsifiers are paraffin sulfonates, alkyl benzene sulfonates, alkyl naphthalene sulfonates, soaps of linear or branched, saturated or unsaturated fatty acids, fatty alcohol and synthetic alcohol sulfates, alkyl diphenyl ether disulfonates, sulfosuccinic acid monoesters and diesters of linear, branched or cyclic alcohols and, quite generally, sulfates, sulfonates, sulfosuccinates, isethionates, phosphates and ether carboxylic acids of the nonionic emulsifiers mentioned below. Where the emulsifiers to be used in accordance with the invention are used together with other anionic emulsifiers, it is preferred to keep the total quantity of emulsifier below 5% by weight, based on monomers.

The phosphate sulfonates to be used in accordance with the invention may also be used in combination with nonionic co-emulsifiers. This can lead to dispersions having increased stability, for example to shear forces, temperature influences and electrolytes. The nonionic emulsifiers are added in quantities of 0.5 to 5% by weight and preferably in quantities of 1 to 3% by weight, based on monomers. The nonionic emulsifiers may be introduced at the beginning of polymerization or in the course of polymerization. In another variant, a pre-emulsion is prepared using the nonionic emulsifiers and is added in the course of polymerization. Nonionic emulsifiers may also be added to the dispersions obtained using the phosphate sulfonates of general formula I for the purpose of post-stabilization. Typical examples of nonionic emulsifiers are linear, branched, cyclic, saturated and unsaturated alkyl polyglycol ethers, more particularly fatty alcohol polyglycol ethers;

mono-, di- and trialkylaryl polyglycol ethers, more particularly octyl and nonyl phenol polyglycol ethers, dinonyl phenol polyglycol ethers, triisobutyl phenol polyglycol ethers;

aryl polyglycol ethers, for example reaction products of phenol with 3 to 10 mol ethylene oxide;

polyglycol ethers of hydroxyalkanols, for example according to DE-A 33 19 782;

end-capped alkyl or alkylaryl polyglycol ethers, for example according to DE-A 35 30 301 and DE-A 36 43 896;

carboxylic acid polyglycol esters, more particularly fatty acid polyglycol esters;

fatty acid alkanolamide/ethylene oxide adducts, more particularly coconut oil fatty acid monoethanolamide/ ethylene oxide adducts;
ethylene oxide/propylene oxide block polymers;
sorbitan esters, more particularly sorethoxylated bitan monolaurate +20 mol ethylene oxide;
ethoxylated fatty amines.

The phosphate sulfonates of general formula I to be used in accordance with the invention may also be used together with protective colloids. Typical examples of such protective colloids are completely or partly saponified homopolymers and/or copolymers of vinyl acetate, for example partly saponified polyvinyl acetate, or partly saponified copolymers of vinyl acetate and vinyl ethers. Preferred copolymers contain 1 to 4 carbon atoms in the ether part of the polyvinyl ether. Other protective colloids may be derived from polysaccharides. Thus, cellulose ethers, such as hydroxyethyl cellulose, hydroxypropyl cellulose, carboxymethyl cellulose, methyl cellulose, ethyl cellulose or cellulose mixed ethers, are particularly suitable. Polyacrylamide and copolymers thereof with acrylic acid, acrylonitrile or acrylates are also suitable. Condensates of naphthalene sulfonate acid and formaldehyde or other water-soluble formaldehyde resins, more particularly urea/formaldehyde resins, may also be used. Finally, casein, gelatine, gum arabic and natural starch and substituted starch derivatives, such as hydroxyethyl starch, are suitable protective colloids.

So-called copolymerizable emulsifiers—better referred to as stabilizing monomers—may also be used together with the emulsifiers to be used in accordance with the invention and include, for example, vinyl sulfonate, allyl sulfonate, 2-acrylamido-2-methyl propane sulfonic acid, vinyl phosphonic acid and also acrylates and methacrylates of nonionic emulsifiers or styrene sulfonic acid.

The invention is illustrated by the following Examples.

The production of phosphate sulfonates of general formula I to be used in accordance with the invention and the methods used to test the polymer dispersions obtained in accordance with the invention will first be explained.

1. Tested phosphate sulfonates of general formula I (internally substituted oleyl phosphate sulfonates)
a) oleyl phosphate sulfonate Na salt (from oleyl alcohol having an iodine value of approx. 80)
b) oleyl phosphate sulfonate Na salt (from oleyl alcohol having an iodine value of 108)

The oleyl phosphate sulfonates mentioned above are referred to hereinafter as OPS 80 and OPS 108.

2. Preparation of the oleyl phosphate sulfonates
a) OPS 80
Preparation of the oleyl phosphate:

420 g (1.5 mol) technical oleyl alcohol present in admixture with small amounts of cetyl alcohol (HD Ocenol ® 80/85: iodine value 89, OH value 205) were introduced into a 1-liter three-necked flask equipped with a stirrer and thermometer. At a temperature of 60° to 70° C., 71 g (0.5 mol) phosphorus pentoxide were uniformly introduced over a period of 2 hours by means of a powder metering unit protected against atmospheric moisture. Following an after-reaction time of 2 hours at 70° C., 10 ml water were added and the reaction mixture was stirred for another 3 hours at 90° C.

490 g of a dark-colored oil having the following characteristic data were obtained:

| | |
|---|---|
| Monoester | 43.3% by weight |
| Diester | 38.4% by weight |
| Triester | 3.4% by weight |
| $H_3PO_4$ | 1.7% by weight |
| Free alcohol | 13.0% by weight |
| $H_2O$ (Fischer) | 0.15% by weight |
| Iodine value | 74 |
| Average molecular weight | 451 |
| Double bond equivalent per mol phosphate | 1.3 |

Production of the oleyl phosphate sulfonate Na salt:

225 g (0.5 mol) oleyl phosphate were introduced into a 1 liter sulfonation flask equipped with a mechanical stirrer, gas inlet pipe and jacket cooling and were reacted at 35° C. with 68 g (0.85 mol) $SO_3$ corresponding to a 30% excess based on the double bond equivalents. The $SO_3$ was driven out by heating from a corresponding quantity of oleum, diluted with nitrogen to a concentration of 5% by volume and introduced into the phosphoric acid ester over a period of 31 minutes during which the temperature of the reaction mixture was kept below 50° C. by cooling. After the sulfonation, the reaction mixture was cooled to 10° C., stirred into a dilute solution of 40 g (1 mol) NaOH in 700 ml water and subsequently hydrolyzed on a steam bath for 4 hours at 95° to 100° C. After cooling to 20° C., the pH value of the reaction mixture was adjusted to 7.0 by addition of HCl solution.

Characteristic data of the product:

| | |
|---|---|
| Anionic surfactant (two-phase titration method corresponding to Einheitsmethode DGF-H-III-10) | 16% by weight = 0.30 mval/g |
| Unsulfonated components (DGF-GIII-6b) | 1% by weight |
| $Na_2SO_4$ | 1% by weight |
| $Na_3PO_4$ | <0.1% by weight |
| $H_2O$ (Fischer) | 82% by weight |
| Total sulfur | 1.2% by weight |
| Average molecular weight | 539 |
| Klett color value | 135 | b) OPS 108
Preparation of the oleyl phosphate

The procedure described in 2a for the preparation of the oleyl phosphase was repeated using 420 g (1.5 mol) of a technical oleyl alcohol having an iodine value of 108. Approx. 485 g of a yellowish oil were obtained.
Characteristic data of the product:

| | |
|---|---|
| Monoester | 42.9% by weight |
| Diester | 38.2% by weight |
| Triester | 3.2% by weight |
| Phosphoric acid (free) | 1.5% by weight |
| Fatty alcohol (free) | 13.0% by weight |
| Water (Fischer) | 0.10% by weight |
| Iodine value | 83 |
| Average molecular | 453 |
| Double bond equivalent | 1.3 |

Preparation of the oleyl phosphate sulfonate Na salt

The procedure described in 2a for the preparation of the oleyl phosphate sulfonate Na salt was repeated using 226 g (0.5 mol) of the oleyl phosphate obtained as described above.
Characteristic data of the product:

| | |
|---|---|
| Anionic surfactant content | 15.9% by weight = 0.029 mEq/g |
| Unsulfonated components | 1% by weight |
| Sodium sulfate | 1% by weight |
| Sodium phosphate | 0.1% by weight |
| Water | 82.1% by weight |
| Average molecular weight | 541 |

3. Tests for polymer dispersions obtained in accordance with the invention a) Coagulate content after production The prepared dispersion and any coatings formed on the reaction vessel and stirrer were poured through a Schwegmann tared Perlon sieve bag (mesh width 80 microns). The sieve bag together with any coagulate present was dried for 24 h at 105° C. and the coagulate was determined by differential weighing.

b) Solids content

Sartorius type 709301dry residue determination balance. The solids content was determined at stage 7 with a drying time of 20 minutes. The quantity weighed in was 5 g.

c) pH value

The pH value was determined with a commercially available pH meter.

d) Viscosity

Viscosity was measured with a Brookfield RVT viscosimeter at 25° C. (spindle 1, 10 r.p.m.$^{-1}$).

e) Minimum film-forming temperature (MFT)

The MFT was determined with a Coesfeld film-forming and blocking temperature tester in accordance with DIN 53787.

f) Mechanical stability

The mechanical stability of the dispersion was tested with a type HM 5 UB 2 klaxon stirrer with addition of a foam inhibitor in accordance with ASTM D 1706.

g) Foaming test

A test liquid consisting of 50 g of the polymer dispersion and 450 g fully deionized water was poured into a 2 liter measuring cylinder equipped with a heating jacket. By means of a flow inducer (Heidolph type RG-L 85), the test liquid was continuously circulated at 25° C. at a throughput of 3 l/min. Using a glass tube, the test liquid was taken in from the bottom of the measuring cylinder and was returned to the cylinder through a second glass tube. After a maximum time of 10 minutes, circulation was terminated and the maximum foam volume (total volume) was read off. The total volume was read off at time intervals of 1, 2, 3, 5, 10 and 20 minutes and the values determined were recorded in a volume/time graph.

Example 1

Copolymerization of a mixture of vinyl acetate and tert. monocarboxylic acid vinyl ester The monocarboxylic acid vinyl ester was a commercially available mixture of a vinyl ester of isomeric, synthetic, saturated, substantially tertiary monocarboxylic acids having a chain length of $C_{10}$, described in Technische Broschüre AES/VVX/4 (G), 3rd Edition, October 1976, published by Shell-Chemie, and is referred to hereinafter by the same abbreviation as used there, namely VeoVa 10.

The copolymerization was carried out in a closed, heatable 2 liter plane-ground beaker equipped with a V4A anchor stirrer (stirring speed 100 to 150 r.p.m.), feed vessels and a reflux condenser.

The following reaction components were first separately prepared:
Component I:
191.5 g fully deionized water
1.3 g OPS 80 (100% active substance)
0.5 g potassium peroxodisulfate (starter)
0.2 g borax (buffer).
Component II:
282.3 g fully deionized water
0.8 g OPS 80 (100% active substance)
17.1 g of a commercially available adduct of 30 mol ethylene oxide with nonylphenol (70% active substance; co-emulsifier)
1.9 g potassium peroxodisulfate
2 1 g borax
Component III:
330.1 g vinyl acetate
143.5 g VeoVa 10
4.8 g acrylic acid
For pH adjustment:
23.9 g ammonium carbonate solution (10%).

Component I was initially introduced into the reaction vessel. The vessel was then purged with nitrogen for 30 minutes while stirring and subsequently heated to 80° C. During the heating phase, a pre-emulsion was prepared in the feed vessel by addition of component III to component II with stirring. When the temperature in the reactor reached 80° C., the pre-emulsion was added over a period of 2 hours. After the addition, the temperature was kept at 80° C. for another 2 hours. The dispersion was then cooled. The pH value was adjusted to approx. 7 with the 10% ammonium carbonate solution.

Example 2

Production of an ethyl acrylate/acrylic acid copolymer
The following components were initially prepared:
Component I:
662.6 g fully deionized water
3.2 g OPS 80
0.4 g NaOH (pellets) dissolved in 8.7 g fully deionized water.
Component II:
0.5 g ammonium peroxodisulfate dissolved in 8.7 g fully deionized water.
Component III:
8.0 g hydrogen peroxide (30%)
Component IV:
290.9 g ethyl acrylate
9.0 g acrylic acid.
For pH adjustment:
8.0 g conc. ammonia Component I was initially introduced into the reaction vessel described in Example 1. The reaction vessel was purged with nitrogen for 30 minutes and subsequently heated to 80° C. Component II was added at 70° C. When the temperature in the reactor reached 80° C., component IV was added over a period of 60 minutes. After another 10 minutes, component III was added. The temperature was then kept at 86° to 87° C. for another 40 minutes. The dispersion obtained was cooled. The pH value was adjusted to approx. 8 with concentrated ammonia.

Example 3

Production of an ethylhexyl acrylate/methyl methacrylate/ methacrylic acid copolymer
The following components were initially prepared:
Component I:

195.6 g fully deionized water
3.5 g OPS 80 (100% AS)
0.3 g potassium peroxodisulfate
0.5 g sodium hydrogen carbonate
Component II:
245.6 g fully deionized water
1.5 g OPS 80 (100% AS)
6.2 g of a commercially available adduct of 20 mol ethylene oxide with nonylphenol (80% active substance, co-emulsifier)
1.9 g potassium peroxodisulfate
Component III:
225.4 g 2-ethylhexyl acrylate
254.8 g methyl methacrylate
9.8 g methacrylic acid
Component IV:
4.8 g potassium peroxodisulfate solution, 5%
For pH adjustment:
50.0 g sodium hydrogen carbonate solution, 10%.

Component I was initially introduced into the reaction vessel described in Example 1. The reaction vessel was purged with nitrogen for 30 minutes while stirring and subsequently heated to 75° C. During the heating phase, the pre-emulsion was prepared in the feed vessel by addition of component III to component II with stirring.

When the temperature in the reactor reached 75° C., the monomer pre-emulsion was added over a period of 2 h. After the addition, the reaction was post-initiated with potassium peroxodisulfate solution (component IV) and the temperature was kept at 85° C. for 1 h. The dispersion was then cooled and the pH value was adjusted to approx. 7 with a 10 % sodium hydrogen carbonate solution.

Examples 1, 2 and 3 were repeated with the corresponding quantity of OPS 108.

Testing of the polymer dispersions obtained produced the results set out in Table 1 (MFT=minimum film-forming temperature). The results of the foam measurements are summarized in Table 2. The phosphate sulfonates tested proved to be low-foaming.

TABLE 1

| Testing of the dispersions obtained | | |
|---|---|---|
| Example 1 | OPS 80 | OPS 108 |
| Coagulate (%) | 0.5 | 0.4 |
| Dry residue (%) | 49.3 | 49.0 |
| Viscosity (mPa · s) | 120 | 123 |
| pH value | 6.8 | 6.6 |
| MFT (°C.) | 14–15 | 13–15 |
| Mechanical stability* | Stable | Stable |

*Addition of 0.25% by weight Dehydran G (commercially available foam inhibitor for water-containing systems)

| Example 2 | OPS 80 | OPS 108 |
|---|---|---|
| Coagulate (%) | 0.9 | 1.2 |
| Dry residue (%) | 29.6 | 29.5 |
| Viscosity (mPa · s) | 17.5 | 17.5 |
| pH value | 8.1 | 8.3 |
| MFT (°C.) | 0 | 3 |
| Mechanical stability* | 0.1 | 0.1 |

*Addition of 0.25% by weight Dehydran G (commercially available foam inhibitor for water-containing systems), % by weight coagulate

| Example 3 | OPS 80 | OPS 108 |
|---|---|---|
| Coagulate (%) | 0.1 | 0.2 |
| Dry residue (%) | 50.2 | 50.1 |
| Viscosity (mPa · s) | 40 | 40 |
| pH value | 7.4 | 7.2 |
| MFT (°C.) | 34–36 | 34–36 |
| Mechanical stability | Stable | Stable |

TABLE 2

| | | Results of foam measurement | | | | |
|---|---|---|---|---|---|---|
| Component | Formulation | Total volume | | | | |
| | | 0' | 1' | 3' | 5' | 20' |
| OPS 80 | I | 1980 | 1940 | 1800 | 1600 | 600 |
| OPS 108 | I | 1960 | 1920 | 1820 | 1500 | 600 |
| OPS 80 | II | 800 | 400 | 400 | 380 | — |
| OPS 108 | II | 900 | 440 | 380 | 380 | — |
| OPS 80 | III | 1540 | 1400 | 1080 | 700 | 400 |
| OPS 108 | III | 1900 | 1600 | 700 | 600 | 400 |

We claim:

1. In the emulsion polymerization of one or more monomers in which at least one of the monomers is substantially water insoluble, the improvement wherein the emulsion polymerization reaction mixture contains an emulsifying effective quantity of at least one salt of a sulfonated alkenyl or alkenyl (poly) oxyalkyl phosphate of formula I $$[R^1O-(CH_nH_{2n}O)_x-][R^2O-(C_nH_{2n}O)_y-][R^3O-(C_nH_{2n}O)_z-]P=O \quad (I)$$

in which $R^1$ is a group corresponding to formula IIa or IIb $$CH_3-(CH_2)_a-CH(OH)-(CH_2)_b-CH(SO_3M)-(CH_2)_c-CH_2- \quad (IIa)$$

$$CH_3-(CH_2)_a-CH(SO_3M)-(CH_2)_b-CH(OH)-(CH_2)_c-CH_2- \quad (IIb)$$

or is a residue formed by elimination of one water molecule from the group corresponding to formula IIa or IIb, $R^2$ and $R^3$ may be the same or different and represent hydrogen or a residue having the meaning given above for the group $R_1$, n is the number 2 and/or 3, x, y and z may be the same or different and represent numbers of 0 to 100 a, b and c are numbers of 0 to 18, the sum of a, b and c being a number of 12 to 18, and M is an alkali metal ion, the ammonium ion, a protonated amine ion, or an equivalent of an alkaline-earth metal ion.

2. The process of claim 1 in which the compound of formula I x, y and z represent numbers of from 0 to 30.

3. The process of claim 1 wherein in the compound of formula I, the $R^1$ group is salt of a sulfonated oleyl group, $R^2$ and $R^3$ are hydrogen or a salt of a sulfonated oleyl group, n is the number 2, and x, y and z are numbers of from 0 to 20.

4. The process of claim 1 wherein in the compound of formula I, M is the sodium ion.

5. The process of claim 3 wherein in the compound of formula I the salt is the sodium salt.

6. The process of claim 1 wherein the emulsifying effective quantity is from about 0.5 to about 10% by weight, based on the weight of monomers.

7. The process of claim 6 wherein the emulsifying effective quantity is from about 1 to about 5% by weight, based on the weight of monomers.

8. The process of claim 6 wherein the emulsifying effective quantity is from about 1 to about 3% by weight, based on the weight of monomers.

9. The process of claim 1 in which the emulsion polymerization process is carried out at a temperature in the range of from about 40° to about 100° C.

10. The process of claim 9 wherein the temperature is in the range of from about 50° to about 90° C.

11. The process of claim 1 wherein the pH of the emulsion polymerization reaction mixture is from about 3 to about 9.

12. The process of claim 1 wherein another anionic emulsifier is also present in the emulsion polymerization reaction mixture.

13. The process of claim 1 wherein from about 0.5 to about 5% by weight, based on monomers, of a nonionic emulsifier is also present in the emulsion polymerization reaction mixture.

14. The process of claim 1 wherein the emulsion polymerization reaction mixture also contains a protective colloid.

15. The process of claim 1 wherein the emulsifying effective quantity is from about 0.5 to about 10% by weight, based on the weight of monomers; in the compound of formula I the $R^1$ group is a salt of a sulfonated oleyl group, $R^2$ and $R^3$ are hydrogen or a salt of a sulfonated oleyl group, n is the number 2, and x, y and z are numbers of from 0 to 10; and the emulsion polymerization process is carried out at a temperature of from about 40° to about 100° C.

16. The process of claim 15 wherein the process is carried out at a temperature of from about 50° to about 90° C. and at a pH of from about 3 to about 9.

* * * * *